(12) United States Patent
Kawabayashi (10) Patent No.: US 10,304,205 B2
(45) Date of Patent: May 28, 2019

(54) IMAGE PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Hisashi Kawabayashi, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 43 days.

(21) Appl. No.: 15/481,961

(22) Filed: Apr. 7, 2017

(65) Prior Publication Data

US 2017/0301106 A1 Oct. 19, 2017

(30) Foreign Application Priority Data

Apr. 15, 2016 (JP) .................................. 2016-082351

(51) Int. Cl.
*A61B 5/00* (2006.01)
*G06T 7/70* (2017.01)
*G06T 7/20* (2017.01)
*G06T 7/13* (2017.01)
*G06T 7/60* (2017.01)
*G06F 3/00* (2006.01)

(52) U.S. Cl.
CPC .................. *G06T 7/70* (2017.01); *G06T 7/13* (2017.01); *G06T 7/20* (2013.01); *G06T 7/60* (2013.01)

(58) Field of Classification Search
CPC ..................................... G06T 7/00; G06K 9/00
USPC ......................................................... 382/103
See application file for complete search history.

(56) References Cited

U.S. PATENT DOCUMENTS 7,885,784 B2 * 2/2011 Frank ................. A63B 24/0021
702/150
2008/0281553 A1 * 11/2008 Frank ................. A63B 24/0021
702/150

FOREIGN PATENT DOCUMENTS

JP 2001-253391 A 9/2001
WO 2012/127618 A1 9/2012

* cited by examiner

*Primary Examiner* — Abolfazl Tabatabai
(74) *Attorney, Agent, or Firm* — Carter, DeLuca & Farrell LLP

(57) ABSTRACT

An image processing apparatus comprises a moving object detection unit configured to detect a moving object from a moving image; a detection unit configured to detect from the moving image a line corresponding to the moving object; and a determination unit configured to determine, based on a detection result of the detection unit, whether the moving object is a self-moving object.

18 Claims, 6 Drawing Sheets

IMAGE PROCESSING APPARATUS, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium.

Description of the Related Art

Conventionally, there is known a technique of searching for and tracking a floating object floating on the water. In Japanese Patent Laid-Open No. 2001-253391, a ship emits a laser beam on the water from its rotating base and searches for a target object present within a predetermined search range by detecting reflected light from the target object. The target object is then automatically tracked by rotating the rotating base, based on the reflected light, so that the target object is in a predetermined position of an image.

However, the technique disclosed in Japanese Patent Laid-Open No. 2001-253391 is problematic in that, due to water current, discrimination of whether a target object is a self-moving object (such as a ship) or a floating object carried by water current is not possible.

The present invention has been made in consideration of the above problem and provides a technique for discriminating, regarding each object in an image, between a self-moving object and a floating object.

SUMMARY OF THE INVENTION

According to one aspect of the present invention, there is provided an image processing apparatus comprising: a moving object detection unit configured to detect a moving object from a moving image; a detection unit configured to detect from the moving image a line corresponding to the moving object; and a determination unit configured to determine, based on a detection result of the detection unit, whether the moving object is a self-moving object.

Further features of the present invention will become apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

An object that moves on the water forms a triangular waveform (predetermined shape waveform) called a ship wake about the head of the object as the center. This embodiment will describe an image processing apparatus that detects a self-moving object in a moving image captured by an image capturing apparatus in a monitoring system for monitoring objects on the water. More specifically, an example in which a self-moving object is recognized by detecting a predetermined shape waveform from a moving object on the water shown in a moving image will be described.

<Overall Arrangement>

Figure 1:
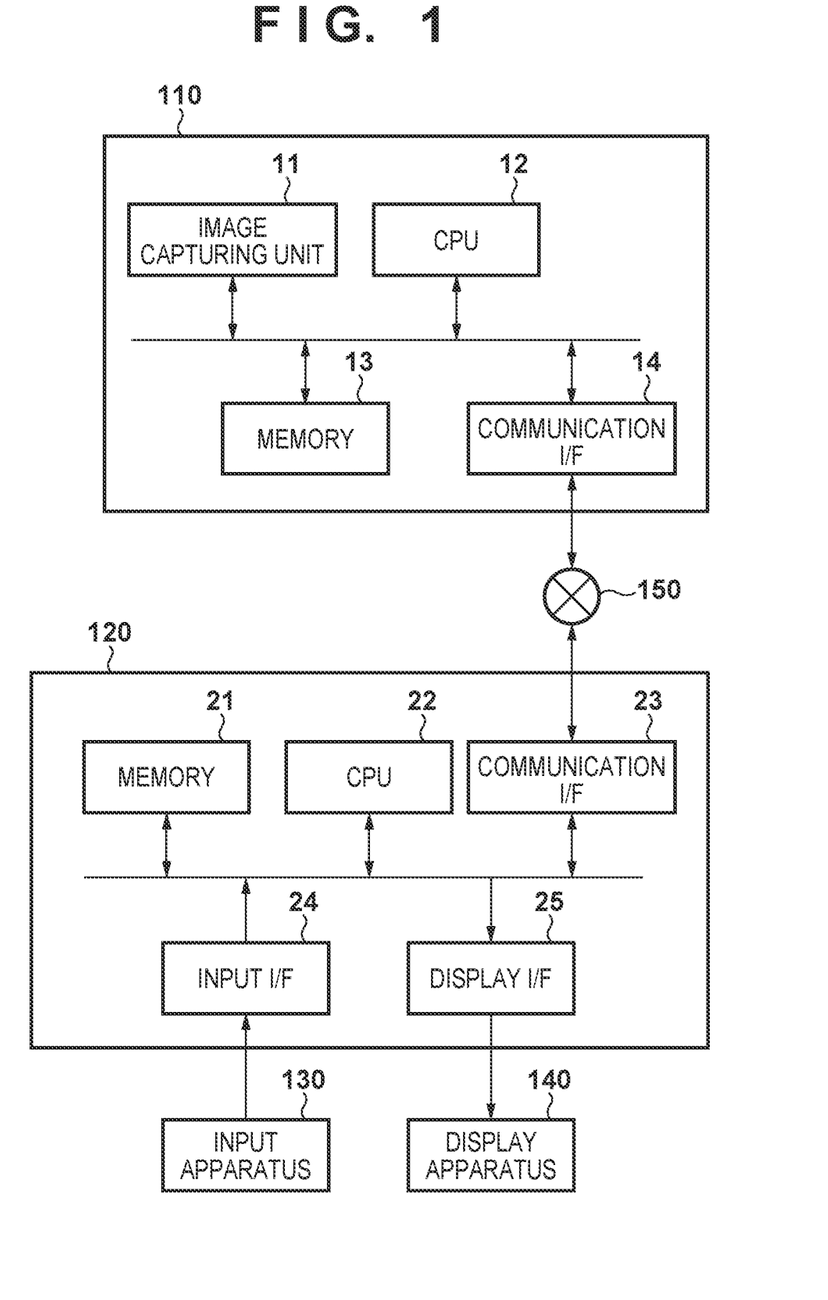
FIG. 1 is a block diagram showing an example of the hardware arrangement of an image capturing apparatus and an image processing apparatus according to an embodiment of the present invention.

FIG. 1 is a block diagram showing an example of the hardware arrangement of an image capturing apparatus and an image processing apparatus forming a monitoring system according to an embodiment of the present invention. An image capturing apparatus 110 performs image capturing on the water. The image capturing apparatus 110 may be attached to an aircraft to capture an image on the water or may be attached to a ship sailing on the water. An image processing apparatus 120 performs drive control of the image capturing apparatus 110, image processing of an image captured by the image capturing apparatus 110, and display control processing. In the same manner, the image processing apparatus 120 may also be included in an aircraft or a ship. Alternatively, the image processing apparatus may be provided in a distant separate location.

An input apparatus 130 is formed from a mouse and a keyboard and accepts user input to the image processing apparatus 120. A display apparatus 140 is formed from a display and displays an image output by the image processing apparatus 120. The image processing apparatus 120 and the display apparatus 140 are shown as independent apparatuses in FIG. 1. However, the image processing apparatus 120 and the display apparatus 140 may have an integrated arrangement. In addition, the input apparatus 130 and the display apparatus 140 may have an integrated arrangement. Alternatively, the image processing apparatus 120, the input apparatus 130, and the display apparatus 140 may be integrated and arranged.

The image capturing apparatus 110 and the image processing apparatus 120 are connected by a network 150. The network 150 is formed from, for example, a plurality of routers, switches, and cables satisfying a communication standard such as a local area network. In this embodiment, any type, scale, or arrangement of communication standard may be used as long as communication is possible between the image capturing apparatus 110 and the image processing apparatus 120.

For example, the network 150 may be formed from the Internet, a wired LAN (Local Area Network), a wireless LAN, or a WAN (Wide Area Network). The number of image capturing apparatuses to be connected to the image processing apparatus 120 is not limited to one image capturing apparatus 110, and a plurality of image capturing apparatuses may be connected.

<Hardware Arrangement of Image Capturing Apparatus>

Details of the hardware arrangement of the image capturing apparatus 110 will be described next with reference to FIG. 1. The image capturing apparatus 110 includes, as the hardware arrangement, an image capturing unit 11, a CPU 12, a memory 13, and a communication I/F 14. The image capturing unit 11 includes an image sensor and an optical system. The image capturing unit 11 performs image capturing using, as the image capturing center, the intersection of the image sensor and an optical axis of the optical system based on the control by the CPU 12. The image sensor is an image sensor such as a CMOS (Complementary Metal-Oxide Semiconductor) or a CCD (Charged Coupled Device). The CPU 12 controls each component of the image capturing apparatus 110.

The memory 13 stores images captured by the image capturing unit 11, programs used by the CPU 12 when executing processing, and data. The communication I/F 14 controls communication with the image processing apparatus 120 via the network 150 based on control by the CPU 12. The CPU 12 reads out and executes the programs stored in the memory 13 to perform the functions of the image capturing apparatus 110.

<Hardware Arrangement of Image Processing Apparatus>

Details of the hardware arrangement of the image processing apparatus 120 will be described next. The image processing apparatus 120 includes, as the hardware arrangement, a memory 21, a CPU 22, a communication I/F 23, an input I/F 24, and a display I/F 25. The CPU 22 controls each component of the image processing apparatus 120. The memory 21 stores captured images transmitted from the image capturing apparatus 110, programs used by the CPU 22 when executing processing, and data.

The communication I/F 23 controls the communication via the network 150 with the image capturing apparatus 110 based on control by the CPU 22. The input I/F 24 connects the image processing apparatus 120 and the input apparatus 130 and controls the information input from the input apparatus 130. The display I/F 25 connects the image processing apparatus 120 and the display apparatus 140 and controls the information output to the display apparatus 140. The CPU 22 reads out and executes the programs stored in the memory 21 to implement the functions of the image processing apparatus 120 and the processing of the flowchart of FIG. 3 (to be described later).

However, the hardware arrangement of the image processing apparatus 120 is not limited to that shown in FIG. 1. For example, the image processing apparatus 120 may include a sound output apparatus such as a loudspeaker having a function as an output unit. If the image processing apparatus 120 includes the sound output apparatus in the hardware arrangement, sound output processing of a warning or the like may be one example of the output processing.

Figure 2:
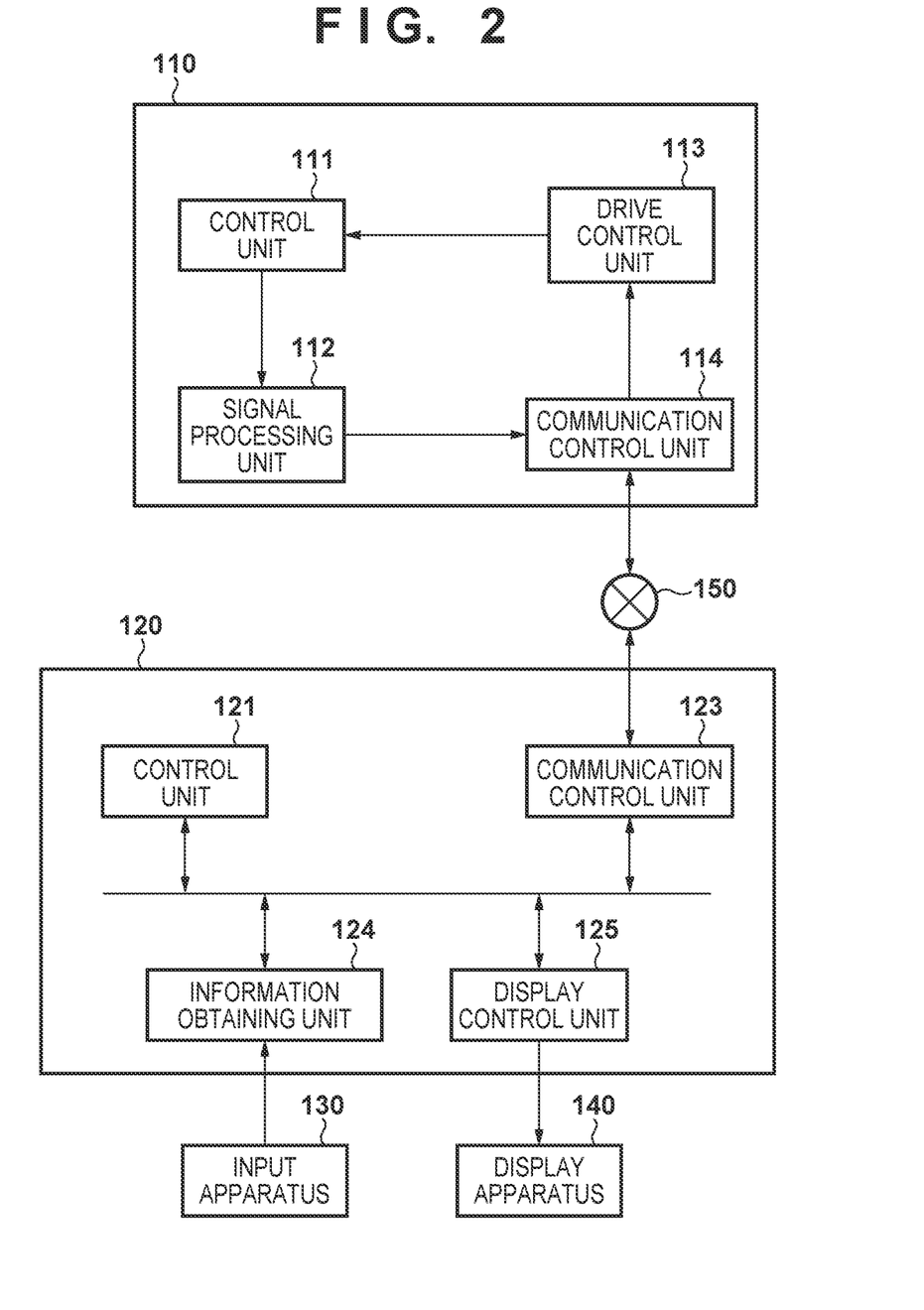
FIG. 2 is a block diagram showing an example of the functional arrangement of the image capturing apparatus and the image processing apparatus according to the embodiment of the present invention.

FIG. 2 is a block diagram showing the functional arrangement of the image capturing apparatus and the image processing apparatus that form a monitoring system according to the embodiment of the present invention.

<Functional Arrangement of Image Capturing Apparatus>

As shown in FIG. 2, the image capturing apparatus 110 includes, as the functional arrangement, a control unit 111, a signal processing unit 112, a drive control unit 113, and a communication control unit 114. The control unit 111 controls each component of the image capturing apparatus 110. The signal processing unit 112 processes the image signal captured by the image capturing unit 11. For example, the signal processing unit 112 encodes an image captured by the image capturing unit 11.

As the encoding method, the signal processing unit 112 may use, for example, JPEG (Joint Photographic Experts Group). Alternatively, H.264/MPEG-4 AVC (to be referred to as H.264 hereinafter) or HEVC (High Efficiency Video Coding encoding method) may be used. However, the encoding method is not limited to these. The signal processing unit 112 may also encode an image by selecting an encoding method from a plurality of encoding methods.

The drive control unit 113 controls the image capturing direction and the angle of view of the image capturing unit 11. Although this embodiment will describe a case in which the image capturing unit 11 can change the image capturing direction in a pan direction and a tilt direction and change the image capturing angle of view, the present invention is not limited to this. The image capturing apparatus 110 may not include a function that changes the image capturing direction in the pan direction and the tilt direction and may not include a function to change the angle of view, either. The communication control unit 114 transmits a captured image processed by the signal processing unit 112 to the image processing apparatus 120. The communication control unit 114 receives a control instruction transmitted from the image processing apparatus 120 to the image capturing apparatus 110.

<Functional Arrangement of Image Processing Apparatus>

As shown in FIG. 2, the image processing apparatus 120 includes, as the functional arrangement, a control unit 121, a communication control unit 123, an information obtaining unit 124, and a display control unit 125. The control unit 121 controls the entire image processing apparatus 120. The communication control unit 123 receives a captured image from the image capturing apparatus 110. The information obtaining unit 124 obtains input information from the input apparatus 130 that accepted the user input. The display control unit 125 outputs an image to the display apparatus 140 and causes the display apparatus 140 to execute display processing (to be described later).

In this embodiment, the image processing apparatus 120 performs detection processing of a predetermined shape (a diagonal waveform in this embodiment) in a captured image obtained from the image capturing apparatus 110. This allows diagonal waveform detection processing to be performed on a real-time live image. However, the present invention is not limited to this. For example, the image processing apparatus 120 may obtain a moving image stored in the image capturing apparatus 110 and perform the diagonal waveform detection processing from each frame image.

Alternatively, the diagonal waveform detection processing may be performed from each frame image forming the moving image saved in the image processing apparatus 120. The image processing apparatus 120 may also access a recording server and perform diagonal waveform detection processing from each frame image of a moving image stored in the recording server.

<Processing of Image Processing Apparatus>

Figure 3:
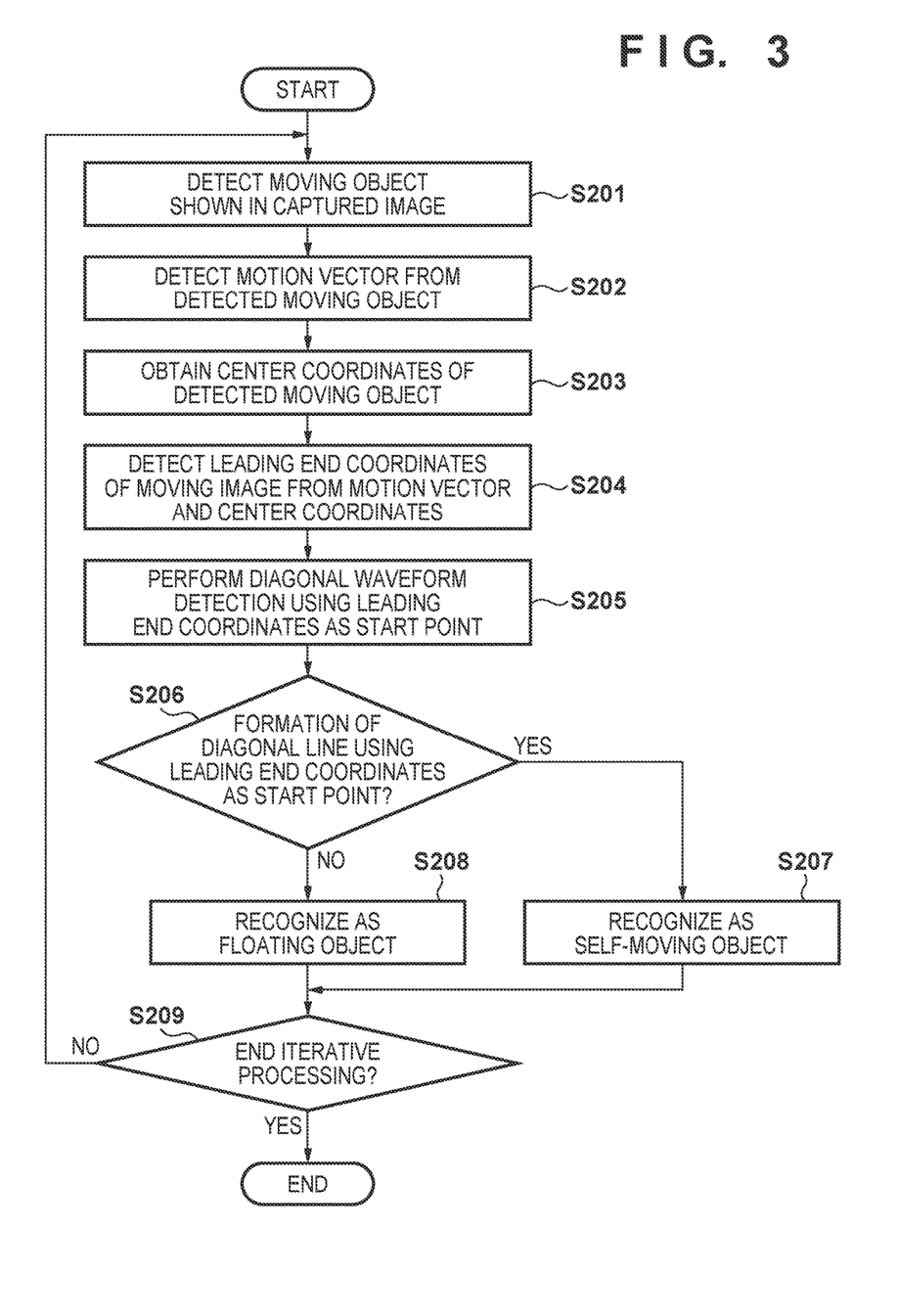
FIG. 3 is a flowchart showing a processing procedure implemented by an image processing apparatus according to the first embodiment.

The procedure of self-moving object detection processing according to this embodiment will be described below with reference to FIGS. 3 to 6. FIG. 3 is a flowchart showing an example of the procedure of the self-moving object detection processing implemented by the image processing apparatus 120 according to this embodiment. Specific details will be described later.

Figure 4:
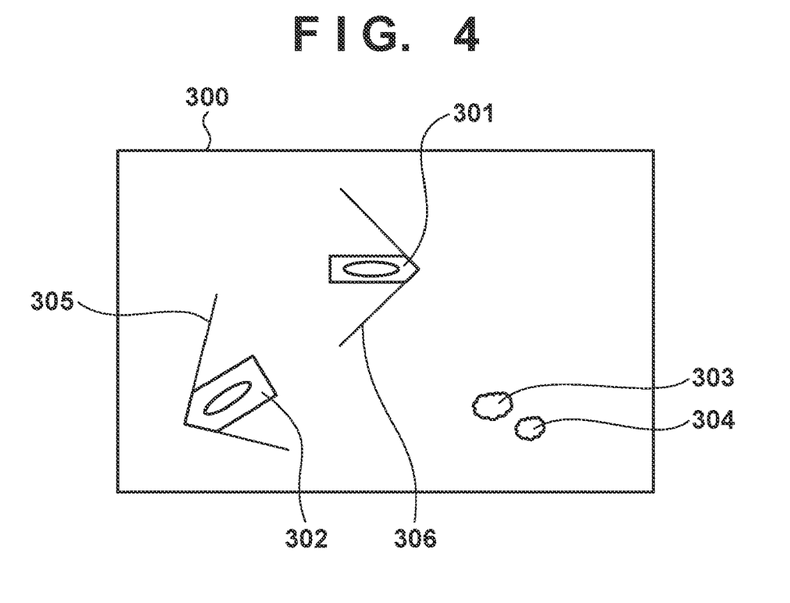
FIG. 4 is a view showing an example of a captured image according to the embodiment of the present invention.

FIG. 4 shows an example of a captured image 300 that the image processing apparatus 120 has obtained from the image capturing apparatus 110. In the captured image 300, moving objects 301 to 304 on the water have been captured simultaneously. The moving objects 301 and 302 are self-moving objects. Ships, canoes, and boats are such examples. The moving objects 303 and 304 are floating objects. Trash and buoys are such examples. Each of diagonal lines 305 and 306 is a diagonal waveform, that is, a ship wake according to this embodiment.

Figure 5:
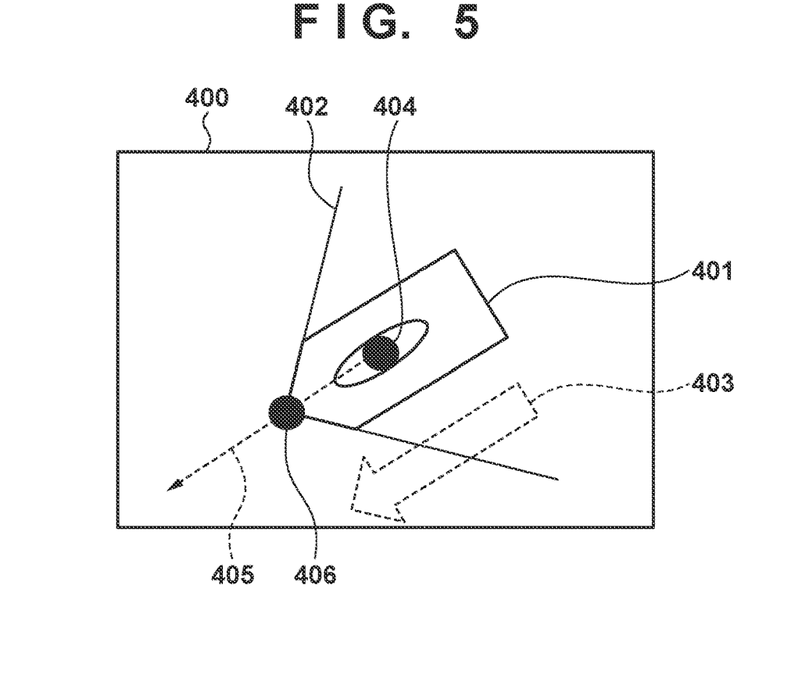
FIG. 5 is a view for explaining moving object leading end coordinates detection processing according to the embodiment of the present invention.

FIG. 5 is a view showing one example of leading end coordinate detection processing of a moving object in the captured image 300. An image 400 is an image obtained by enlarging a portion of the captured image 300. A moving object 401 in the image 400 corresponds to the moving object 302 in the captured image 300. A diagonal line 402 corresponds to the diagonal line 305 in the captured image 300. Reference numeral 403 denotes a motion vector of the moving object 401.

For example, a motion vector is detected from a positional difference between a previous frame image and a current frame image in the moving image. Reference numeral 404 denotes center coordinates of moving object 401. Reference numeral 405 denotes a motion vector of moving object 401 starting from the center coordinates 404. Reference numeral 406 denotes leading end coordinates of the moving object 401.

The image processing apparatus 120 starts, upon obtaining a captured image (moving image) from the image capturing apparatus 110, the self-moving object detection processing shown in the flowchart of FIG. 3.

First, the control unit 121 performs moving object detection processing (step S201) to the captured image 300 obtained from the image capturing apparatus 110. A general moving object detection method such as a background difference method can be used as the moving body detection method.

Next, the control unit 121 detects (step S202) the motion vector 403 to obtain the traveling direction of the moving object detected in step S201. A general motion vector detection method such as a block matching method can be used as the detection method of the motion vector 403.

The control unit 121 then obtains (step S203) the center coordinates 404 of the moving object in the current frame image. More specifically, the barycenter of pixel coordinates forming the moving object is obtained and set as the center coordinates 404. However, the center coordinates are not limited to the barycenter. The center of a circumscribed rectangle circumscribing the moving object may be set as the center coordinates 404.

The control unit 121 performs scanning from the obtained center coordinates 404 in the direction of the motion vector 405 and sets boundary pixel coordinates of the moving object intersecting with the motion vector 405 as the leading end coordinates 406 (step S204). However, the method of deriving the leading end coordinates 406 is not limited to this procedure, and another method may be used.

The control unit 121 performs detection processing (step S205) of the diagonal waveform (the diagonal line 402) using the leading end coordinates 406 detected in step S204 as the start point. More specifically, the control unit 121 detects the edge from the captured image 300. A general method can be used for edge detection. A Sobel filter, a Laplacian filter, or the like is an example of edge detection.

Figure 6:
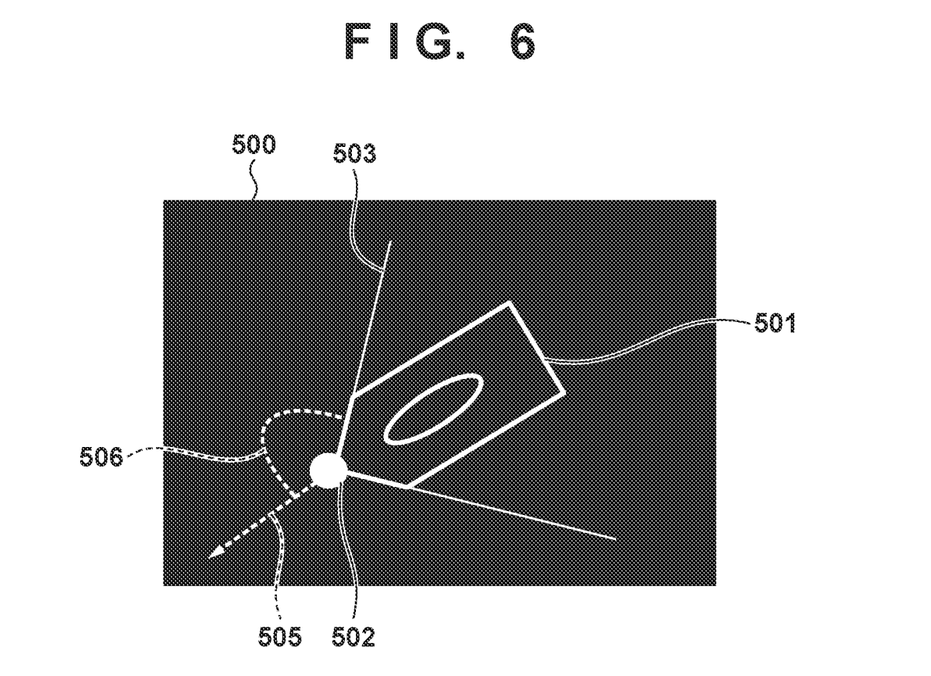
FIG. 6 is a view for explaining diagonal waveform detection processing according to the embodiment of the present invention.

Here, FIG. 6 is a view for explaining the diagonal waveform detection of an edge extracted from the image 400. In FIG. 6, an image 500 is an image obtained by edge detection from the image 400. The control unit 121 projects the detected leading end coordinates 406 on the edge detection result of the image 500. Reference numeral 502 denotes the projected leading end coordinates.

Using the vicinity of the leading end coordinates 502 as a start point, the control unit 121 detects that a diagonal waveform is extending toward the rear. First, in diagonal line detection processing, a straight line 503 (a linear waveform) is detected using the vicinity of the leading end coordinates 502 a start point. A general straight line detection method can be used for the detection of the straight line 503. The Hough transform is an example of such straight light detection method.

Next, the control unit 121 determines whether the detected straight line 503 forms a diagonal waveform (step S206). In this embodiment, if the detected straight line 503 and a motion vector 505 are not parallel, it is determined the detected straight line is a diagonal waveform. Note that the motion vector 505 corresponds to the motion vector 405.

Whether the detected straight line 503 and the motion vector 505 are parallel (in the same direction) is determined by obtaining, as indicated by reference numeral 506, an outer product of the vector of the detected straight line 503 and the motion vector 505. If the outer product 506 is 0, it is parallel. Since it is not parallel otherwise, the formation of a diagonal waveform can be determined when the outer product is not 0.

If it is determined that a diagonal waveform has been detected (YES in step S206), the control unit 121 recognizes the moving object as a self-moving object (step S207). On the other hand, if it is determined that a diagonal waveform has not been detected (NO in step S206), the control unit 121 recognizes the moving object as a floating object (step S208). Note that the control unit 121 may transmit, via the network 150, the determination result in step S207 or step S208 to another apparatus by using the communication control unit 123. The determination result may also be output and displayed on the display apparatus 140 by using the display control unit 125. Alternatively, the determination result may be output via a sound output apparatus (not shown).

The control unit 121 determines whether to end the iterative processing (step S209). If the processing is not to be ended, the process returns to step S201, and the image processing apparatus 120 obtains a captured image, that is, a moving image, from the image capturing apparatus 110 again and repetitively executes the self-moving object detection processing.

In the captured image 300, in order to accurately detect the diagonal waveform from the leading end coordinates of the moving object, it is necessary to capture an image from a sufficient height so as to look down on the water. Hence, the attachment position, the attachment angle, and the angle of view of the image capturing apparatus 110 need to be pre-adjusted.

As described above, in this embodiment, the leading end coordinates in the traveling direction of the moving object on the water are detected, and the moving object is recognized as a self-moving object if there is a diagonal waveform having the coordinates as a leading end. As a result, it is possible to discriminate and detect each self-moving object and each floating object among moving objects on the water in an image. In addition, even under an environment in which a plurality of self-moving objects having different speeds and floating objects coexist, a self-moving object and a floating object can be discriminated from each other by the diagonal waveform.

Second Embodiment

In this embodiment, the method of detecting a self-moving object described in the first embodiment will be used to describe the processing to detect the occurrence of an accident to the self-moving object. The self-moving object is tracked. If the diagonal waveform disappears and the self-moving object is recognized as a floating object, the occurrence of an accident is recognized.

Figure 7:
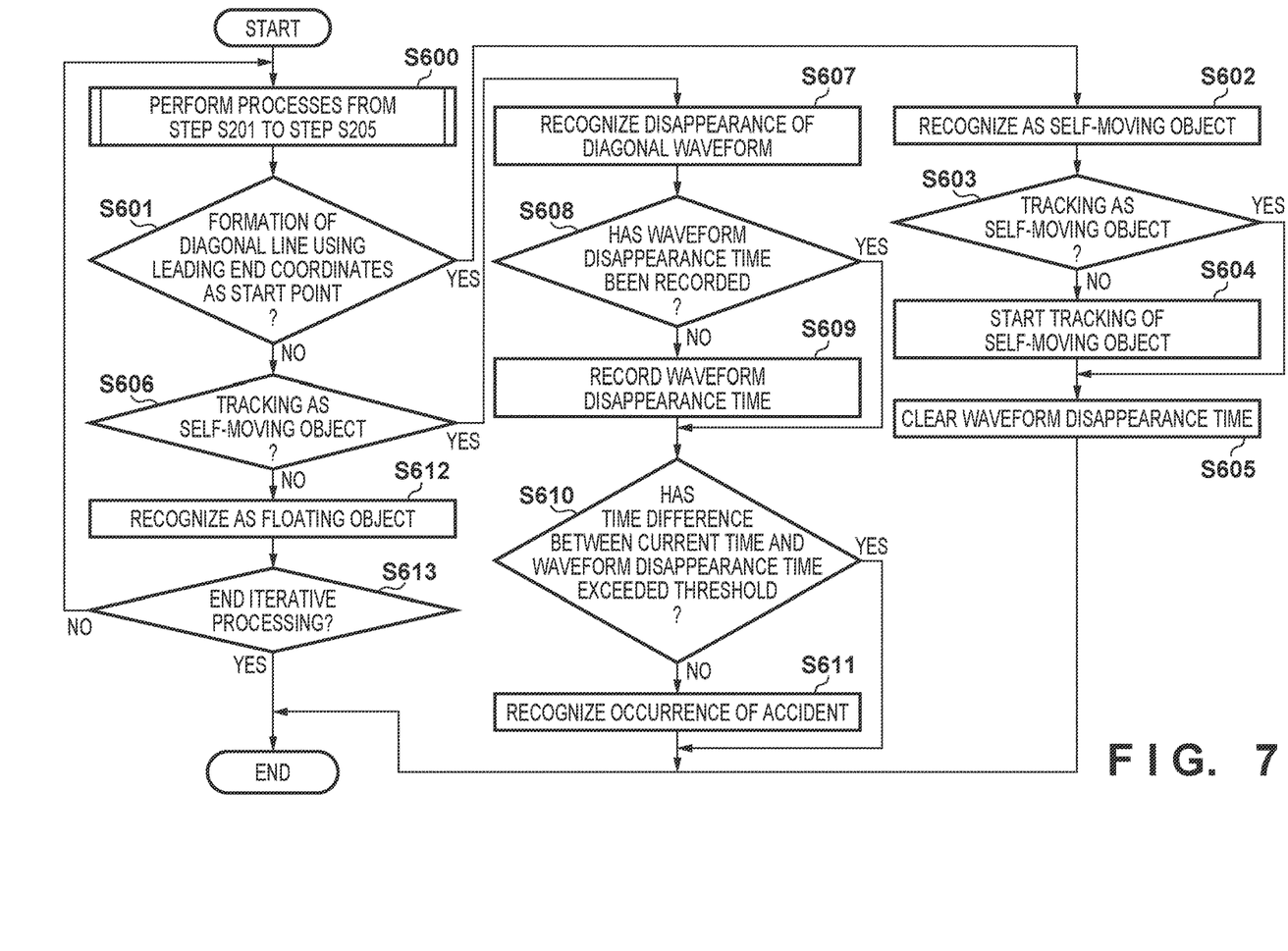
FIG. 7 is a flowchart showing the procedure of self-moving object accident detection processing implemented by an image processing apparatus according to the second embodiment of the present invention.

A processing procedure of determining whether an accident has occurred to the self-moving object according to this embodiment will be described below with reference to the flowchart of FIG. 7. The control unit 121 performs detection processing (step S600) of a diagonal waveform using leading end coordinates as the start point in the same manner as the processes of steps S201 to S205 in the first embodiment. Next, the control unit 121 determines whether a diagonal waveform has been formed (step S601). If a diagonal waveform has been formed (YES in step S601), the control unit 121 recognizes the moving object as a self-moving object (step S602). On the other hand, if no diagonal waveform has been formed (NO in step S601), the process advances to step S606.

The control unit 121 determines whether the recognized self-driving object is already being tracked (step S603). If the self-moving object is already being tracked (YES in step S603), the process advances to step S605. On the other hand, if the self-moving object is not being tracked (NO in step S603), tracking is started (step S604). As the tracking method of the moving object, for example, a general method such as that disclosed International Publication No. 2012/127618 may be used. Here, assume that one or more self-moving objects can be tracked at once.

Next, the control unit 121 clears (step S605) a waveform disappearance time (to be described later). This allows the control unit to grasp that the waveform has not disappeared. If the diagonal waveform has not been formed in step S601, the control unit 121 determines whether the moving object was being tracked as a self-moving object (step S606). If the moving object was being tracked as a self-moving object (YES in step S606), the process advances to step S607. On the other hand, if the moving object was not being tracked as a self-moving object (NO in step S606), the process advances to step S612.

Since the diagonal waveform cannot be detected from the traced self-moving object, the control unit 121 recognizes that the waveform has disappeared (step S607). The control unit 121 then determines whether information of the wave disappearance time has been recorded (step S608). If the information of the wave disappearance time has been recorded (YES in step S608), the process advances to step S610. On the other hand, if the information of the waveform disappearance has not been recorded (NO in step S608), the process advances to S609.

If the disappearance time has not been recorded in step S608, the control unit 121 records (step S609) the time information of a frame image. At this time, time information is the current time if it is a real-time image. If it is a recorded image, time information is the time when the image was recorded.

The control unit 121 determines whether a time difference between the current time and the recorded waveform disappearance time exceeds a threshold (step S610). Here, assume that the value of the threshold can be arbitrarily defined by the user. If the time difference exceeds the threshold (YES in step S610), the process advances to step S611. On the other hand, if the time difference does not exceed the threshold (NO in step S610), the process advances to step S613.

If the time difference exceeds the threshold in step S610, the control unit 121 recognizes that an accident has occurred to the self-moving object which it has tracked (step S611). At this time, the recognition result may be displayed in the display apparatus 140 by using the display control unit 125 or the recognition result may be transmitted to another apparatus connected via the network 150 by using the communication control unit 123.

In a case in which the diagonal waveform is not detected (NO in step S601) and the moving object is not being tracked as a self-moving object (NO in step S606), the control unit 121 recognizes the moving object as a floating object (step S612).

Subsequently, the control unit 121 determines whether the iterative processing is to be ended (step S613). If the processing is not to be ended, the process returns to step S600, and the image processing apparatus 120 obtains a captured image, that is, a moving image from the image capturing apparatus 110 again and executes the series of processes.

The embodiments of the present invention have been described above. However, the present invention is not limited to the specific embodiments. The functional arrangement of the image capturing apparatus 110 may be incorporated in the image capturing apparatus as a software arrangement implemented by the CPU 12 executing processes based on programs stored in the memory 13.

Also, a part of or the entire functional arrangement of the image capturing apparatus 110 may be incorporated in the image capturing apparatus 110 as a hardware arrangement. In the same manner, the functional arrangement of the image processing apparatus 120 may be incorporated in the image processing apparatus 120 as a software arrangement implemented by the CPU 22 executing processes based on programs stored in the memory 21. A part of or the entire functional arrangement of the image processing apparatus 120 may be incorporated in the image processing apparatus 120 as a hardware arrangement.

The diagonal waveform need not be detected from all regions in a captured image. Setting of a detection region and a non-detection region may or may not be allowed. Each of the hardware arrangements of the respective above-described image processing apparatus and image capturing apparatus is just one example of such arrangements. For example, a plurality of CPUs, memories, and communication I/Fs may be included.

Furthermore, the detection of diagonal waveforms is just one example, and any kind of a line may be detected as long as the arrangement is configured to detect a line that can determine a self-moving object (a moving object that is self-moving). For example, it may be an arrangement in which a triangular wave formed from a plurality of lines that is formed near the leading end of the self-moving object may be detected instead of the diagonal lines diagonal with respect to the moving object. The triangular waveform is a triangular wave formed from two or more overlapping different directional waves and has a wave height higher than those of other waves. The triangular wave is also referred to as an overlapping wave. Another line to be detected may be a line representing a spray of water. As described above, it is sufficient as long as a line can determine whether the moving object on the water surface is self-moving.

According to the present invention, it is possible to discriminate, regarding each object in an image, between a self-moving object and a floating object.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-082351, filed Apr. 15, 2016, which is hereby incorporated by reference wherein in its entirety.

What is claimed is:

1. An image processing apparatus comprising:
a computer executing instructions that, when executed by the computer, cause the computer to function as:
a moving object detection unit configured to detect a moving object from a moving image;
a detection unit configured to detect from the moving image a line corresponding to the moving object, wherein the line is a line in which one of end points of the line corresponds to a leading end position of the moving object; and
a determination unit configured to determine, based on a detection result of the detection unit, whether the moving object is a self-moving object.

2. The apparatus according to claim 1, wherein the detection unit detects the leading end position of the moving object in a moving direction of the moving object and detects the line using the leading end position as a reference.

3. The apparatus according to claim 1, further comprising an edge detection unit configured to detect an edge from the moving image,
wherein the detection unit detects the line based on the edge.

4. The apparatus according to claim 1, wherein the detection unit detects a triangular wave shape including the line.

5. The apparatus according to claim 4, wherein the determination unit determines that, when a triangular shape waveform is detected by the detection unit, the moving object is a self-moving object.

6. The apparatus according to claim 1, wherein the detection unit detects the leading end position of the moving object and detects the line using the leading end position as a start point.

7. The apparatus according to claim 6, wherein the detection unit detects coordinates of the leading end position based on a motion vector of the moving object.

8. The apparatus according to claim 6, wherein the detection unit derives a center position of the moving object and detects, as the leading end position, a position intersecting with a boundary pixel of the moving object in the motion vector direction using the center position as the start point.

9. The apparatus according to claim 8, wherein the detection unit detects a linear waveform formed using the leading end position as a start point and performs detection of the line based on a vector of the linear waveform and the motion vector.

10. The apparatus according to claim 9, wherein the detection unit performs detection of the line when directions of the vector of the linear waveform and the motion vector are not the same direction.

11. The apparatus according to claim 1, wherein the detection unit detects the line diagonal to a moving direction of the moving object, and
the determination unit determines, as the self-moving object, an object in which a line having a predetermined angle is detected by the detection unit.

12. An image processing apparatus comprising:
a computer executing instructions that, when executed by the computer, cause the computer to function as:
a moving object detection unit configured to detect a moving object from a moving image;
a determination unit configured to determine whether the moving object is a self-moving object; and
an output unit configured to output an alert when a state changes from a state in which it is determined by the determination unit that the moving object is the self-moving object to a state in which it is determined by the determination unit that the moving object is not the self-moving object.

13. The apparatus according to claim 12, further comprising a detection unit configured to detect from the moving image a line corresponding to the moving object,
wherein the line is a line in which one of end points of the line corresponds to a leading end position of the moving object, and wherein the determination unit is configured to determine, based on a detection result of the detection unit, whether the moving object is the self-moving object.

14. The apparatus according to claim 13, further comprising a tracking unit configured to track, when the moving object is determined as a self-moving object by the determination unit, the self-moving object; and
a determination unit configured to determine that an accident has occurred to the self-moving object when a time since the line corresponding to the moving object tracked by the tracking unit is not detected by the detection unit exceeds a threshold.

15. A method of controlling an image processing apparatus, comprising:
detecting a moving object from a moving image;
detecting a line corresponding to the moving object from the moving image, wherein the line is a line in which one of end points of the line corresponds to a leading end position of the moving object; and
determining, based on a detection result obtained in the detecting, whether the moving object is a self-moving object.

16. A non-transitory computer readable storage medium storing a computer program for causing a computer to perform each step of a method of controlling an image processing apparatus, the method comprising:
detecting a moving object from a moving image;
detecting a line corresponding to the moving object from the moving image, wherein the line is a line in which one of end points of the line corresponds to a leading end position of the moving object; and
determining, based on a detection result obtained in the detecting, whether the moving object is a self-moving object.

17. A method of controlling an image processing apparatus, comprising:
detecting a moving object from a moving image;
determining whether the moving object is a self-moving object; and
outputting an alert when a state changes from a state in which it is determined that the moving object is the self-moving object to a state in which it is determined that the moving object is not the self-moving object.

18. A non-transitory computer readable storage medium storing a computer program for causing a computer to perform each step of a method of controlling an image processing apparatus, the method comprising:
detecting a moving object from a moving image;
determining whether the moving object is a self-moving object; and
outputting an alert when a state changes from a state in which it is determined that the moving object is the self-moving object to a state in which it is determined that the moving object is not the self-moving object.

* * * * *